United States Patent [19]
Yang

[11] Patent Number: 6,149,124
[45] Date of Patent: Nov. 21, 2000

[54] PILOT SOLENOID CONTROL VALVE WITH PRESSURE RESPONSIVE DIAPHRAGM

[75] Inventor: Xiaolong Yang, Germantown, Wis.

[73] Assignee: Husco International, Inc., Waukesha, Wis.

[21] Appl. No.: 09/304,151

[22] Filed: May 3, 1999

[51] Int. Cl.[7] .................................................. F16K 31/12
[52] U.S. Cl. .......................................... 251/30.03; 251/38
[58] Field of Search ..................... 251/30.03, 38

[56] References Cited

U.S. PATENT DOCUMENTS

| | | | |
|---|---|---|---|
| 1,826,343 | 10/1931 | Carson, Jr. ................................ 251/38 |
| 2,705,608 | 4/1955 | Phillips ................................ 251/30.03 |
| 2,888,234 | 5/1959 | Dahl ..................................... 251/30.03 |
| 2,936,780 | 5/1960 | Pratt ..................................... 251/38 X |
| 2,946,551 | 7/1960 | Kovach ............................... 251/30.03 |
| 3,100,103 | 8/1963 | Bullard ............................... 251/38 X |
| 3,391,900 | 7/1968 | Erickson .......................... 251/30.03 X |
| 3,512,749 | 5/1970 | Noakes et al. ..................... 251/30.03 |
| 3,544,062 | 12/1970 | Murray ................................ 251/38 |
| 3,593,956 | 7/1971 | McCarty, Jr. ....................... 251/30.03 |
| 3,768,771 | 10/1973 | Dicken, Jr. ..................... 251/30.03 X |
| 5,579,642 | 12/1996 | Wilke et al. . |
| 5,878,647 | 3/1999 | Wilke et al. . |
| 5,926,955 | 7/1999 | Kober ................................ 251/61.1 X |

*Primary Examiner*—Kevin Shaver
*Assistant Examiner*—John Bastianelli
*Attorney, Agent, or Firm*—Quarles & Brady LLP; George E. Haas

[57] ABSTRACT

A pilot operated control valve has a body with an inlet and an outlet. A main valve poppet is movable within the body to selectively control flow of fluid between the inlet and outlet. The main valve poppet has a flexible diaphragm with a pilot passage therethrough which is opened and closed by movement of a pilot poppet. The diaphragm flexes due to a pressure differential that acts on the pilot poppet, which flexing compensates for adverse effects that the pressure differential has on the operation of the pilot poppet.

18 Claims, 2 Drawing Sheets

6,149,124

PILOT SOLENOID CONTROL VALVE WITH PRESSURE RESPONSIVE DIAPHRAGM

BACKGROUND OF THE INVENTION

The present invention relates to pilot operated hydraulic valves, and to pilot valves which are pressure balanced.

Construction and agricultural equipment have moveable members which are operated by a hydraulic cylinder and piston arrangement. Application of hydraulic fluid to the cylinder traditionally has been controlled by a manual valve, such as the one described in U.S. Pat. No. 5,579,642. In this type of valve, a manual operator lever was mechanically connected to a spool within the valve. Movement of the spool into various positions with respect to cavities in the valve body enables pressurized hydraulic fluid to flow from a pump to one of the cylinder chambers and be drained from the other chamber. By varying the degree to which the spool was moved, the rate of flow into the associated chamber can be varied, thereby moving the piston at proportionally different speeds.

There is a present trend with respect to construction and agricultural equipment away from manually operated hydraulic valves toward electrical controls and the use of solenoid valves. This type of control simplifies the hydraulic plumbing as the control valves do not have to be located in the operator cab. This change in technology also facilitates computerized control of various machine functions.

Solenoid operated pilot valves are well known for controlling the flow of hydraulic fluid and employ an electromagnetic coil which moves an armature in one direction to open a valve. The armature acts on a pilot poppet that controls the flow of fluid through a pilot passage in a main valve poppet. The amount that the valve opens is directly related to the magnitude of electric current applied to the electromagnetic coil, thereby enabling proportional control of the hydraulic fluid flow. Either the armature or another valve member is spring loaded to close the valve when electric current is removed from the solenoid coil.

A drawback of conventional solenoid operated pilot valves results from effects produced by the pressure differential that develops across the valve in the closed state. That pressure differential changes with variation in the load applied to the equipment component that is operated by the hydraulic fluid from the valve. The load and the supply pressure variation affect the pressure at the valve's outlet and produces that pressure differential across the valve. In the closed state, the pressure differential can affect the amount of force required to open the valve and required to produce a given flow rate of the hydraulic fluid. Therefore in a solenoid operated valve, variation in this pressure differential affects the magnitude of electrical current required to operate the valve.

This problem was addressed by providing a pressure balancing stem in the pilot valve passage, as shown in U.S. Pat. No. 5,878,647. This balanced the pressures so that the only forces acting on the pilot poppet were those from the return spring and the electromagnetic coil. While this overcame the effects due to a pressure imbalance in other designs, fluid leakage often occurred along the balancing stem. Attempts to provide a better seal against that leakage increased friction acting on the stem and created a sticking problem that adversely affected smooth valve operation.

SUMMARY OF THE INVENTION

An object of the present invention is to provide a solenoid operated pilot valve for proportionally controlling the flow of hydraulic fluid.

Another object is to provide a compensation mechanism for the pressure differential within a pilot valve.

These and other objectives are satisfied by a pilot operated control valve which has a body defining an inlet passage and an outlet passage. A main valve poppet engages a valve seat to control the flow of fluid between the inlet and outlet passages. A control chamber is defined in the body on a side of the main valve poppet that is remote from the valve seat.

A channel extends through the main valve poppet between the inlet passage and the control chamber. A diaphragm is operably coupled to the main valve poppet and has opposite first and second sides with pilot passage extending therebetween. A first pressure in the control chamber is applied against the first die of the diaphragm and a second pressure in the outlet passage is applied against the second side. A difference between the first pressure and the second pressure produces flexing of the diaphragm.

A pilot poppet is movable with respect to the diaphragm to selectively open and close the pilot passage and an actuator, preferably a solenoid, is provided to move the pilot poppet with respect to the diaphragm.

The diaphragm may be formed as a single piece integral with the main valve poppet or the diaphragm may be a separate piece mechanically attached to the main valve poppet. Various types of materials are disclosed for the diaphragm.

DETAILED DESCRIPTION OF THE INVENTION

Figure 1:
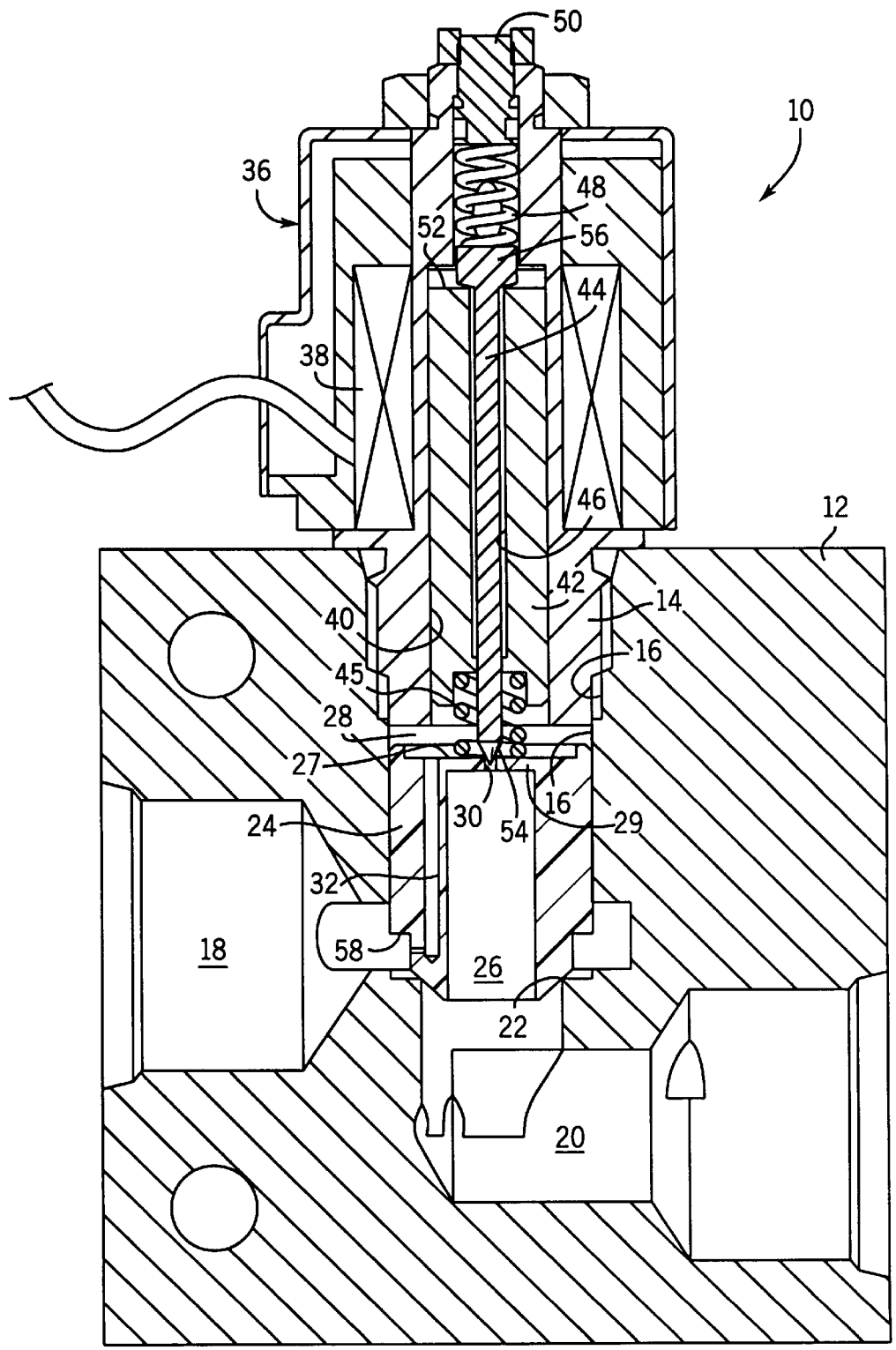
FIG. 1 is cross section through a solenoid operated pilot valve according to the present invention.

With initial reference to FIG. 1, a solenoid valve 10 comprises a cylindrical valve cartridge 14 mounted in a longitudinal bore 16 of a valve body 12. The valve body 12 has a transverse inlet passage 18 which communicates with the longitudinal bore 16. An outlet passage 20 extends through the valve body 12 and communicates with an interior end of the longitudinal bore 16. A valve seat 22 is formed between the inlet and outlet passages 18 and 20.

A main valve poppet 24 slides within the longitudinal bore 16 with respect to the valve seat 22 to selectively control flow of hydraulic fluid between the inlet and outlet passages. The main valve poppet 24 preferably is made from a thermoplastic that is reinforced with glass fibers, such as Torlon (trademark of BPAmoco Plc). A central cavity 26 is formed in the main valve poppet 24 and extends from an opening at the outlet passage 20 to a closed end 27. The thickness of the wall at the closed end 27 forms a flexible diaphragm 29 and a pilot passage 30 extends through the diaphragm. The main valve poppet 24 defines control chamber 28 in the longitudinal bore 16 on the remote side of the diaphragm 29 from central cavity 26. The opposite sides of the diaphragm 29 are exposed to the pressures in the control chamber 28 and the poppet's central cavity 26. A supply channel 32 extends through the main valve poppet 24 from the supply passage 18 to the control chamber 28.

Movement of the main valve poppet 24 is controlled by a solenoid 36 comprising an electromagnetic coil 38, an armature 42 and a pilot poppet 44. The armature 42 is positioned within a bore 40 through the cartridge 14 and a first spring 45 biases the main valve poppet 24 away from the armature. The pilot poppet 44 is located within a bore 46 of the tubular armature 42 and is biased toward the armature by a second spring 48 that engages an adjusting screw 50 threaded into the cartridge bore 40. The electromagnetic coil 38 is located around and secured to cartridge 14. The armature 42 slides within the cartridge bore 40 away from main valve poppet 24 in response to an electromagnetic field created by applying electric current to energize the electromagnetic coil 38.

In the de-energized state of the electromagnetic coil 38, a second spring 48 forces the pilot poppet 44 against end 52 of the armature 42, pushing both the armature and the pilot poppet toward the main valve poppet 24. This results in a conical tip 54 of the pilot poppet 44 entering and closing the pilot passage 30 in the main valve poppet, thereby terminating cutting off communication between the control chamber 28 and the outlet passage 20.

The solenoid valve 10 proportionally controls the flow of hydraulic fluid between the inlet and outlet passages 18 and 20. The rate of hydraulic fluid flow through the valve is directly proportional to the magnitude of electric current applied to the coil 38. The electric current generates an electromagnetic field which draws the armature 42 into the solenoid coil 38 and away from the main valve poppet 24. Because end 52 of the armature 42 engages a shoulder 56 on the pilot poppet 44, that latter element also moves away from the main valve poppet 24, thereby allowing hydraulic fluid to flow from the inlet passage 18 through the control chamber 28, pilot passage 30 and the outlet passage 20.

The flow of hydraulic fluid through the pilot passage 30 reduces the pressure in the control chamber 28 to that of the outlet passage. Thus the higher pressure in the inlet passage that is applied to the surface 58 forces main valve poppet 24 away from valve seat 22 thereby opening direct communication between the inlet passage 18 and the outlet passage 20. Movement of the main valve poppet 24 continues until contact occurs with the conical tip 54 of the pilot poppet 44. Thus, the size of this valve opening and the flow rate of hydraulic fluid therethrough are determined by the position of the armature 42 and pilot poppet 44. Those positions are in turn controlled by the magnitude of current flowing through the electromagnetic coil 38.

The effect that a pressure differential has on the pilot poppet 44 is counterbalanced by flexure of the diaphragm 29 of the main valve poppet 24 in response to that pressure differential. Such movement effectively changes the position of the pilot passage 30 so as to offset the pressure force change on the pilot valve. The designed flexibility of the diaphragm is determined based on the pilot spring rate.

The present diaphragm compensation technique offers several advantages over the balancing stem approach. The cost of machining parts is reduced with improved manufacturability. The operation of the valve has better controllability. Hysteresis which can be a problem in operation of a balancing stem also is reduced.

Figure 2:
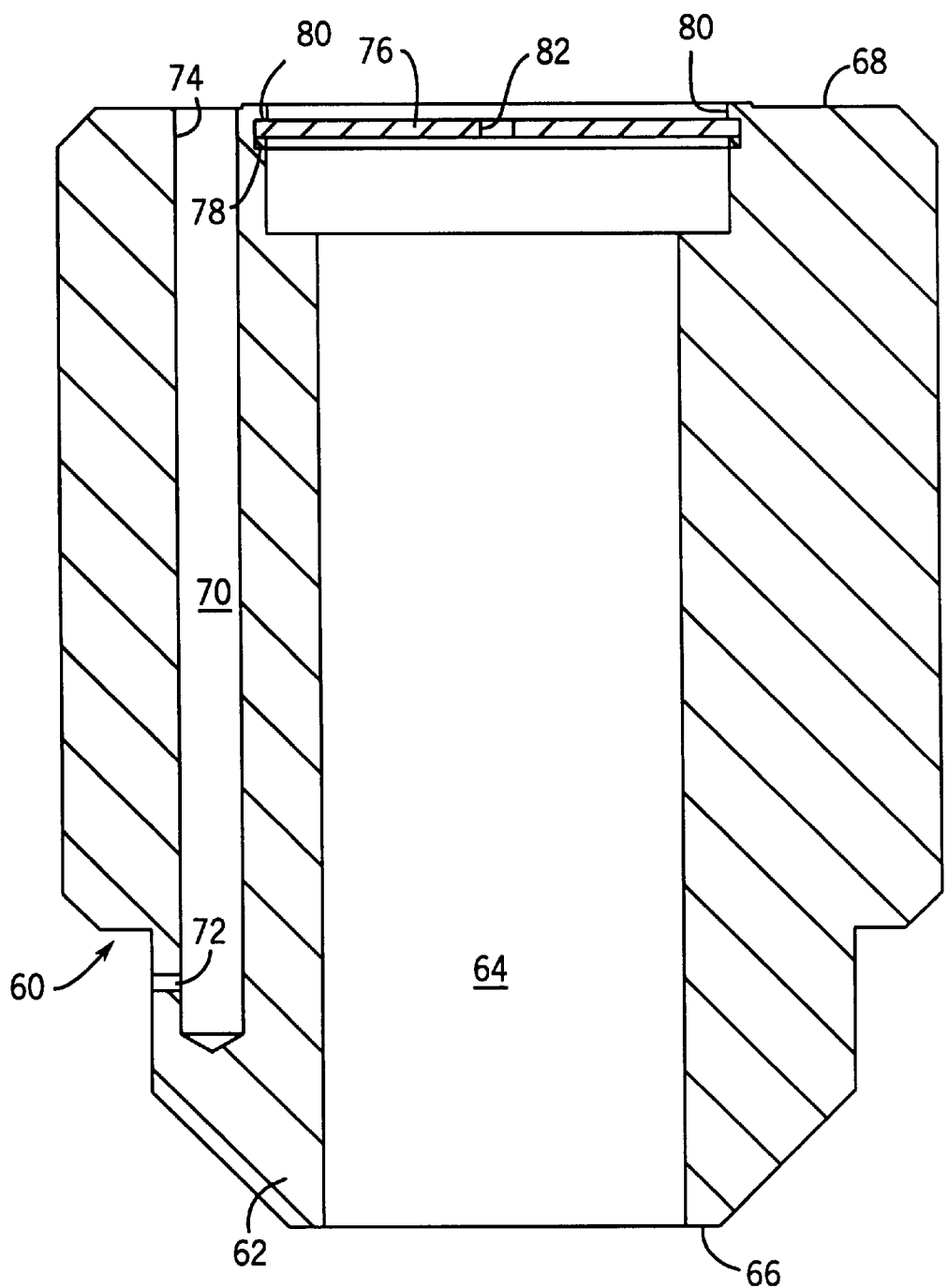
FIG. 2 is an alternative embodiment for a main valve poppet used in the valve of FIG. 1.

FIG. 2 illustrates an alternative embodiment for the main valve poppet. The second main valve poppet 60 has a steel body 62 with a central cavity 64 extending completely therethrough from the outlet passage end 66 to a control chamber end 68. A supply channel 70 extends from an transverse opening 72 for communication with supply passage 18 to another opening 74 at the control chamber end 68.

The opening of the central cavity 64 at the a control chamber end 68 has an enlarged diameter thereby forming a recess in that end of the main valve poppet 60. A separate disk-shaped diaphragm 76 is received in that recess with a ring 78 of resilient material between the diaphragm and the body 62 to provide a fluid-tight seal. For example, the diaphragm 76 can be fabricated from a copper beryllium alloy or a thermoplastic such as one reinforced with glass fibers. The edge of the body 62 at the central cavity opening is crimped over around the diaphragm 76 as indicated at points 80 to hold the diaphragm in place and in contact with the sealing ring 78. A pilot passage 82 extends through the diaphragm for receiving the frustoconical tip 54 of the pilot poppet 44 when the main valve poppet 60 is assembled into the valve body 12.

What is claimed is:

1. In a pilot operated control valve having a body defining an inlet passage and an outlet passage, a main valve poppet selectively engaging a valve seat within the body to control flow of fluid between the inlet and outlet passages, and a control chamber on a side of the main valve poppet remote from the valve seat, an improvement characterized by:

a channel in the main valve poppet extending between the inlet passage and the control chamber;

a diaphragm operably coupled to the main valve poppet and having a first side against which is applied a first pressure in the control chamber, a second side against which is applied a second pressure in the outlet passage, and a pilot passage between the first and second sides, wherein a difference between the first pressure and the second pressure produces flexing of the diaphragm;

a pilot poppet movable with respect to the diaphragm to selectively open and close the pilot passage; and an actuator operably coupled to move the pilot poppet with respect to the diaphragm.

2. The pilot operated control valve recited in claim 1 wherein the actuator is a solenoid with an armature that operates the pilot poppet.

3. The pilot operated control valve recited in claim 1 wherein the actuator is a solenoid comprising:

an electromagnetic coil;

an armature within the electromagnetic coil and having an aperture through which the pilot poppet extends; and a spring biasing the pilot poppet against the armature.

4. The pilot operated control valve recited in claim 1 wherein the main valve poppet comprises a cavity that has a first end with an opening into one of the control chamber and the outlet passage, and a second end closed by the diaphragm.

5. The pilot operated control valve recited in claim 1 wherein the diaphragm is formed with the main valve poppet as a single piece.

6. The pilot operated control valve recited in claim 5 wherein the diaphragm and the main valve poppet are formed of a thermoplastic.

7. The pilot operated control valve recited in claim 1 wherein the diaphragm is located within a recess in the main valve poppet at the second end of the cavity.

8. The pilot operated control valve recited in claim 1 further comprising a resilient seal between the diaphragm and the main valve poppet.

9. The pilot operated control valve recited in claim 1 wherein the diaphragm is formed of a material selected from a group consisting of a thermoplastic and a copper beryllium alloy.

10. In a control valve having a body with an inlet passage and an outlet passage, a main valve poppet that controls a flow of fluid between the inlet and outlet passages by selectively engaging a valve seat within the body, and a control chamber on a remote side of the main valve poppet from the valve seat, an improvement comprising:

a channel extending in the main valve poppet between the inlet passage and the control chamber;

a balancing member engaging the main valve poppet and having a first side against which is applied a first pressure in the control chamber, a second side against which is applied a second pressure in the outlet passage, and a pilot passage between the first and second sides, wherein variation of a difference between the first pressure and the second pressure produces movement of the balancing member with respect to the main valve poppet;

a pilot poppet movable with respect to the balancing member to selectively open and close the pilot passage; and an actuator operably coupled to move the pilot poppet with respect to the balancing member.

11. The pilot operated control valve as recited in claim 10 wherein the actuator is a solenoid with an armature that operates the pilot poppet.

12. The pilot operated control valve recited in claim 10 wherein the actuator is a solenoid comprising:

an electromagnetic coil;

an armature within the electromagnetic coil and having an aperture through which the pilot poppet extends; and a spring biasing the pilot poppet against the armature.

13. The pilot operated control valve recited in claim 10 wherein the main valve poppet comprises a cavity that has an first end with an opening into one of the control chamber and the outlet passage, and a second end closed by the balancing member.

14. The pilot operated control valve recited in claim 10 wherein the balancing member is formed with the main valve poppet as a single piece.

15. The pilot operated control valve recited in claim 5 wherein the balancing member and the main valve poppet are formed of a thermoplastic.

16. The pilot operated control valve recited in claim 10 wherein the balancing member is located within a recess in the main valve poppet at the second end of the cavity.

17. The pilot operated control valve recited in claim 10 further comprising a resilient seal between the balancing member and the main valve poppet.

18. The pilot operated control valve recited in claim 10 wherein the balancing member is formed of a material selected from a group consisting of a thermoplastic and a copper beryllium alloy.

\* \* \* \* \*